United States Patent
Robinson et al.

(12)

(10) Patent No.: US 6,251,973 B1
(45) Date of Patent: *Jun. 26, 2001

(54) COATINGS AND COATING COMPOSITIONS OF A REACTIVE GROUP-CONTAINING POLYMER, A HYDRAZIDE AND A SILANE

(75) Inventors: Gregory Frantz Robinson; Robin Carol Shemancik, both of Kernersville; Robert Dale Speight, Trinity; Philip Titsum Wong, Greensboro, all of NC (US)

(73) Assignee: Akzo Nobel N.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,041

(22) Filed: Nov. 23, 1998

(51) Int. Cl.[7] ............................. C08K 5/54; C08K 5/544; C08K 5/24; C08K 5/25
(52) U.S. Cl. ...................... 524/188; 524/261; 524/265; 524/269
(58) Field of Search .................................. 524/188, 261, 524/265, 267

(56) References Cited

U.S. PATENT DOCUMENTS

| | | |
|---|---|---|
| 2,979,514 | 4/1961 | O'Brien et al. . |
| 3,479,328 | 11/1969 | Nordstrom . |
| 3,674,838 | 7/1972 | Nordstrom . |
| 3,834,924 | 9/1974 | Grillo . |
| 4,046,729 | * 9/1977 | Scriven et al. . |
| 4,061,845 | 12/1977 | Fabris et al. . |
| 4,126,747 | 11/1978 | Cowherd, III et al. . |
| 4,171,413 | 10/1979 | Hartman et al. . |
| 4,176,103 | 11/1979 | Cruden et al. . |
| 4,279,833 | 7/1981 | Culbertson et al. . |
| 4,340,497 | 7/1982 | Knopf . |
| 4,546,046 | 10/1985 | Etzell et al. . |
| 4,584,354 | 4/1986 | Hudecek et al. . |
| 4,758,632 | 7/1988 | Perekh et al. . |
| 4,849,464 | 7/1989 | Davies et al. . |
| 5,216,078 | 6/1993 | Cook et al. ........................ 525/124 |

FOREIGN PATENT DOCUMENTS

| | | |
|---|---|---|
| 0 458 144 A1 | 11/1991 | (EP) . |
| 0 618 238 A1 | 10/1994 | (EP) . |
| 0 765 922 A1 | 4/1997 | (EP) . |
| 53-142496 | 12/1978 | (JP) . |
| 04 21747-A | 8/1992 | (JP) . |
| 4-214 747 | 8/1992 | (JP) . |
| 09-176 437 | 7/1997 | (JP) . |

OTHER PUBLICATIONS

Laid–Open Patent Gazette No. 97–176488, Iwao Mihara, *A Crosslinking Polymer Dispersion*, Jul. 8, 1997, p. 1–32.
Laid–Open Patent Gazette No. 97–176437, Iwao Mihara, *A Crosslinking Water Polymer Dispersion*, Jul. 8, 1997, p. 1–37.
Laid–Open Patent Gazette No. 92–214747, Yamauchi, et al., *A Self–crosslinking High Polymer (high molecular) Latex Composition*, Aug. 5, 1992, p. 1–23.
Laid–Open Patent Gazette No. 78–142496, Kobayashi, An Acrylic Acid Hydrazide Copolymer, Dec. 12, 1978, p. 1–10.
Hüls America, Inc., Dynasylan® Glymo, (Nov. 7, 1996), p. 1–7.
Hüls America, Inc., Hydrosil™ 2776, (Jul. 1, 1997), p. 1–7.
Hüls America, Inc., Silane Coupling Agents, (1991), p. 1–14.
Hüls America, Inc., Silanes–Silicones Commercial Products, (1994), p. 4,5,7, 10.
Chen, et al., Epoxy Silanes In Reactive Polymer Emulsions, (Dec. 1997), p. 49–55.

* cited by examiner

Primary Examiner—Robert Dawson
Assistant Examiner—Jeffrey B. Robertson
(74) Attorney, Agent, or Firm—Lainie E. Parker; Peter Deluca

(57) ABSTRACT

Novel coating compositions including a polymer, a silane and a hydrazide. The polymer having at least one reactive functional group. Optionally, the coating composition includes a pigment. Coatings made from such compositions are also described. Methods of preparing a coating by applying the coating composition to a substrate and curing to form a film are also described herein. The preferred coating compositions are formaldehyde-free and isocyanate-free, can be air cured and provide coatings that exhibit improved adhesion to the substrate, improved print and block resistance and improved solvent and water resistance.

54 Claims, No Drawings

COATINGS AND COATING COMPOSITIONS OF A REACTIVE GROUP-CONTAINING POLYMER, A HYDRAZIDE AND A SILANE

TECHNICAL FIELD

This disclosure relates to novel coating compositions prepared from a reactive polymer, a hydrazide compound and a silane compound. The coating compositions, which can be formaldehyde-free and isocyanate-free, cure to provide an interpenetrating network (IPN) coating having excellent properties.

BACKGROUND OF RELATED ART

Paints can be considered as falling into two general categories, namely, water-based paints and solvent-based paints. Which category of paint is suitable for a given application depends on the conditions to be experienced by the paint. Conventional water-based paints have generally been considered inferior to solvent-based paints with respect to weather resistance, solvent resistance and adhesion. Recently, however, the use of solvent-based paints has become environmentally disfavored, with an emphasis being placed on achieving acceptable results with paints having a relatively low volatile organic content ("VOC"). Specifically, efforts have been made to provide paints or coating which are isocyanate-free and formaldehyde-free yet which exhibit acceptable physical characteristics.

It is therefore an object of the present invention to provide a coating composition which can be isocyanate-free and formaldehyde-free, yet exhibit good adhesion, durability, chemical resistance, water resistance and print resistance. This desired combination of properties has now been achieved by the novel coating compositions described herein.

SUMMARY

The novel coating compositions described herein include a polymer and a silane. The polymer has at least one reactive functional group and a hydrazide group. The silane can be selected from the group consisting of silanes and polysilanes. Optionally, the coating composition includes a pigment. Coatings made from such compositions are also described. Methods of preparing a coating by applying the coating composition to a substrate and curing to form a film are also described herein.

The preferred coating compositions in accordance with this disclosure are formaldehyde-free and isocyanate-free, can be air cured and provide coatings that exhibit improved adhesion to the substrate, improved print and block resistance and improved solvent and water resistance.

DESCRIPTION OF PREFERRED EMBODIMENTS

The novel coating compositions in accordance with this disclosure include: (a) a polymer having at least one reactive functional group, the polymer also having a hydrazide group attached thereto; and (b) a silane.

Polymers useful in forming the coating compositions include, for example, acrylic polymers, modified acrylic polymers, polyepoxides, polyesters, polycarbonates, polyurethanes, polyamides, polyimides, polysiloxanes, polycarbamates and mixtures thereof. The molecular weight of the polymer is not critical. The polymer will generally have a molecular weight of 2,000 to 2,000,000 and preferably from 100,000 to 1,000,000.

The polymer includes reactive functional groups. The functional groups can provide a site for attachment of the hydrazide-containing compound and also can provide a site for cross-linking by the silane compound as described in detail below. Suitable reactive functional groups include, for example, carboxyl, hydroxyl, epoxy, amino alkylamino, multi-functional amine, amido and keto groups or combinations thereof. The degree of substitution of the reactive functional groups is not critical, but rather can be adjusted to provide a coating having desired characteristics. Thus, for example, where carboxyl groups are present on the polymer, acid numbers as low as about 20 should provide adequate cross-linking to form a coating. However, if a coating which can withstand 200 MEK rubs is desired, an acid number in the range of about 40 to about 80 should be used. The polymer may be self-crosslinking or U.V. curable. It is within the purview of one skilled in the art to prepare suitable polymers containing reactive functional groups. Suitable polymers are commercially available from a variety of suppliers.

Where acrylic polymers are utilized, such polymers can be prepared from monomers such as acrylic acid and methacrylic acid, alkyl and cycloalkyl acrylates and methacrylates having 1 to 18, preferably 4 to 13, carbon atoms in the alkyl or cycloalkyl moiety, or mixtures of such monomers. Examples of these include methyl acrylate, methyl methacrylate, ethyl acrylate, ethyl methacrylate, n-butyl acrylate, n-butyl acrylate, n-butyl methacrylate, 2-ethylhexyl acrylate, cyclohexyl methacrylate, and 2-ethylhexyl methacrylate.

The reactive functionality on the acrylic polymer may be incorporated by reacting functional monomers having carboxyl, hydroxyl, epoxy, amino, and alkylamino functional groups. Carboxyl containing monomers include acrylic acid, methacrylic acid, crotonic acid, itaconic acid, maleic acid, fumaric acid, 2-acryloxymethoxy-O-phthalic acid, 2-acryloxy-1-methylethoxy-O-hexahydrophthalic acid. Hydroxy functional monomers include 2-hydroxylethyl acrylate, 2-hydroxyethyl methacrylate, hydroxypropyl methacrylate, hydroxy butyl acrylate, hydroxybutyl methacrylate, allyl alcohol, and methallyl alcohol. Epoxy functional monomers include glycidyl methacrylate. Examples of alkylamino acrylates and methacrylates include aminomethyl, aminopropyl, aminobutyl and aminohexyl acrylates and methacrylates, dimethylaminoethyl acrylate, and dimethylaminoethyl methacrylate. Other suitable monomers include N-alkoxymethylacrylamide, and N-(butoxymethyl)acrylamide. Other ethylenically unsaturated monomers such as vinyl, styrene, α-methyl styrene, vinyl toluene, t-butyl styrene may also be included to provide the desired physical characteristics. Particularly useful polymers are carboxylated styrene acrylate polymers.

Modified acrylics can also be used as the acrylic polymer. Examples of these include polyester-modified acrylics or polyurethane-modified acrylics, as are well known in the art. An example of one preferred polyester-modified acrylic is an acrylic polymer modified with δ-caprolactone. Such a polyester modified acrylic is described in U.S. Pat. No. 4,546,046 to Etxell et al. Polyurethane modified acrylics are well known in the art. An example is set forth in U.S. Pat. No. 4,584,354, the disclosure of which is hereby incorporated by reference.

Polyesters having hydroxyl groups, acid groups, or amino groups as reactive functional groups can also be used as the polymer in the present compositions. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups.

Polyurethanes useful as the polymer in the present compositions can be prepared by reacting polyisocyanate and polyol with an OH:NCO equivalent ratio of greater than 1:1, to obtain polyurethanese with terminal hydroxyl functionality. In this case capping of the isocyanate occurs simultaneously with the synthesis of the polyurethane resin. Alternatively, polyurethane may be formed by reacting polyisocyanate and polyol with an OH:NCO ratio of less than 1:1. In this case, where excess isocyanate is used, the polyurethane having unreacted isocyanate functionality is then reacted with a capping agent. Suitable capping agents include reactive alcohols or amines. Examples of these are trimethylolpropane, ethanolamine, diethanolamine, Solketal, diols, triols, or a mixture of diols and triols. Preferably, any unreacted isocyanate is removed before using the polyurethane as the polymer.

Suitable carbamate functional polymers can be prepared from an acrylic monomer having a carbamate functionality in the ester portion of the monomer. Such monomers are well-known in the art and are described, for example in U.S. Pat. Nos. 3,479,328; 3,674,838; 4,126,747; 4,279,833; and 4,340,497, the disclosures of which are incorporated herein by reference. One method of synthesis involves reaction of a hydroxy ester with urea to form the carbamyloxy carboxylate (i.e., carbamate-modified acrylic). another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxylalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing a polymer useful in the present coating compositions is to react an already-formed polymer such as an acrylic polymer with another component to form a carbamate-functional group appended to the polymer backbone, as described in U.S. Pat. No. 4,758,632, the disclosure of which is incorporated herein by reference. One technique for prepare useful polymers involves thermally decomposing urea (to give off ammonia and HNCO) in the presence of a hydroxy-functional acrylic polymer to form a carbamate-functional acrylic polymer. Another technique involves reacting the hydroxyl group of a hydroxylalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include meta-isocpropenyl-α-α-dimethylbenzyl isocyanate. Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but feasible way of preparing the polymer would be to transesterify an acrylate polymer with a hydroxyalkyl carbamate.

The polymer containing reactive functional groups is preferably provided in the form of a latex, with the term "latex" being used herein in a broad sense to designate any, generally aqueous dispersion of a water-insoluble polymer, the polymer being present in the form of particles.

Grafted onto the polymer is a compound containing a hydrazide group. Preferably, the hydrazide group has the formula:

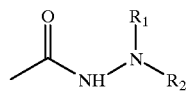

wherein
$R_1$ and $R_2$ each independently represents H or substituted or unsubstituted alkyl.

In one embodiment, the hydrazide group-containing compound also comprises a hindered amine group as is often found in compounds known as hindered amine light stabilizer compounds (HALS). One example of such a compound has the formula:

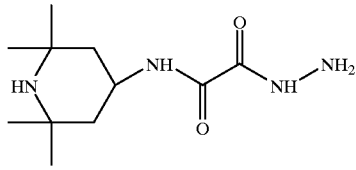

In another embodiment, the hydrazide group-containing compound has the formula:

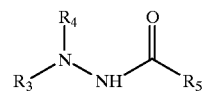

wherein
$R_3$ and $R_4$ each independently represents H or substituted or unsubstituted alkyl, and
$R_5$ represents substituted or unsubstituted alkyl, substituted or unsubstituted aryl, or

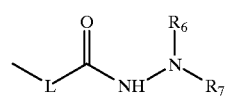

wherein
L represents a divalent linking group, —NH— or —O—. The linking group is preferably aliphatic, but may also be aromatic, cycloaliphatic, or heterocyclic. Preferably, at least one of $R_3$ or $R_4$, and at least one of $R_6$ and $R_7$ represents hydrogen. In another preferred embodiment, all of $R_3$, $R_4$, $R_5$, and $R_5$ represent hydrogen.

The hydrazide group-containing compounds may be prepared from aliphatic organic acids, such as acetic acid, propionic acid, n-octanoic acid, adipic acid, oxalic acid, sebacic acid, and the like. The acid groups are typically reacted with hydrazine as is known in the art to produce the hydrazide derivative of the acid. A preferred hydrazide group-containing compound is adipic dihydrazide.

Examples of other useful compounds comprising hydrazide groups include hydrazides of the formula R—(CONH—NH$_2$)$_n$; bis-hydrazides of the formula NH$_2$—NH—CO—NHNH$_2$; semicarbazides of the formula RNH—CO—NHNH$_2$; thiohydrazides of the formula RNH—CS—NHNH$_2$. In each of the above formulas for hydrazide group-containing compounds, n is a positive integer of at least 1. In a preferred embodiment n=2. R may be hydrogen (except for hydrazides or thiohydrazides when n is 1) or an organic radical. Useful organic radicals include aliphatic, cycloaliphatic, aromatic, or heterocyclic groups, preferably from 1 to 20 carbon atoms. The R groups should be free of substituents that are reactive with hydrazide groups.

Polyhydrazides (e.g., hydrazides or thiohydrazides where n≧2) are preferably used to incorporate hydrazide groups onto the polymer by reacting one of the hydrazide groups with a hydrazide-reactive group on the polymer.

The polyhydrazide can be reacted onto the polymer, by reacting a polyhydrazide with an acrylic or polyester polymer having one or more anhydride or epoxy groups. Alternatively, hydrazine can be reacted directly with the reactive functional groups on the polymer (e.g., with acid groups on an acrylic polymer) to form a hydrazide-functional polymer. Conditions for reacting the hydrazide compound with the polymer are within the purview of one skilled in the art. Typically, the hydrazide compound is simply mixed into a dispersion containing the polymer to effectuate grafting of the hydrazine group onto the polymer. If desired, the hydrazide compound can be mixed with a solvent prior to addition to the polymer dispersion.

The amount of hydrazide compound added is not critical, but rather will depend on a number of factors including the degree of substitution of reactive functional groups on the polymer and the desired characteristics of the final coating. Typically, the hydrazide compound will be added in an amount of from about 0.25 to about 10% by weight, preferably about 0.5 to about 5.0% by weight based on the weight of the total solids content of the coating composition. As those skilled in the art will appreciate, because in a dispersion the polymer will fold upon itself to form particles or micelles, the hydrazide compound will primarily react with reactive functional groups located on the outside of the particle or micelle. Thus, the reactive functional groups within the particle or micelle will remain available for crosslinking by the silane as the polymer molecular unfolds upon removal of water or other solvent is from the coating composition. In particularly useful embodiments, a sufficient number of the reactive groups on the outside of the polymer particle or micelle are reacted with the hydrazide compound to prevent excessive gelling upon addition of silane. This will allow the coating composition to be prepared as a one package system.

To form the present coating compositions, the hydrazide-containing polymers are combined with a silane of the formula

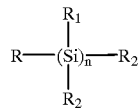

wherein n=1 to 1000, preferably 1 to 100, most preferably 1 to 10; R is an optionally substituted hydrocarbon group containing from 1 to 20 carbon atoms (such as, for example, a methyl phenyl, alkyl or aryl group); R$_1$ is the same or different at each occurrence and is a moiety selected from the group consisting of halogen, hydrogen, alkoxy, hydroxy, amino and epoxy groups; and R$_2$ can be the same or different at each occurrence and is selected from the group consisting of R and R$_1$ as defined above. The aminosilanes and epoxysilanes are particularly useful silanes for making the present coating compositions. Suitable silanes are commercially available from a variety of suppliers. Specific examples of suitable silanes include:
allyltrimethoxysilane;
allyltrimethylsilane;
N-(2-aminoethyl)-3-aminopropyl-methyldimethoxysilane;
N-2-aminoethyl-3-aminopropyltrimethoxysilane;
3-aminopropylmethyldiethoxysilane;
3-aminopropyltriethoxysilane;
3-aminopropyltrimethoxysilane;
bis-(dimethylamino)dimethylsilane;
bis-(n-methylbenzamide)ethoxymethylsilane;
bis(trimethylsilyl)acetamide;
n-butyldimethylchlorosilane;
t-butyldimethylchlorosilane;
chloromethyltrimethylsilane;
3-chloropropyltriethoxysilane;
3-chloropropyltrimethoxysilane;
di-t-butoxydiacetoxysilane;
n, n-diethylaminotrimethylsilane;
dimethylchlorosilane;
dimethyldichlorosilane;
dimethyldiethoxysilane;
dimethylethoxysilane;
dimethylethoxysilane;
dimethyloctadecylchlorosilane;
diphenyldimethoxysilane;
1,3-divinyltetramethyldisilazne;
1,3-divinyltetramethyldisiloxane;
ethyltriacetoxysilane;
(3-glycidoxypropyl)methyldiethoxysilane;
(3-glycidoxylpropyl)trimethoxysilane;
hexamethyldisilane;
isobutyltrimethoxysilane;
3-mercaptopropylmethyldimethoxysilane;
3-mercaptopropyltrimethoxysilane;
3-mercaptopropyltriethoxysilane;
3-methacryloxypropyltrimethoxysilane;
3-methacryloxypropyltris(methylsiloxy)silane;
n-methylainopropyltrimethoxysilane;
methylcyclohexydichlorosilane;
methylcyclohexyldimethoxysilane;
methyltriacetoxysilane;
methyltrichlorosilane;
methyltriethoxysilane;
methyltrimethoxysilane;
n-methyl-n-trimethylsilyltrifluoroacetamide;
octadecyltrichlorosilane;
octyltrichlorosilane;
n-octyltriethoxysilane;
phenyltriethoxysilane;
phenyltrimethoxysilane;
tetra-n-butoxysilane;
tetrachlorosilane;
tetraethoxysilane (teos);
tetrakis (2-ethoxyethoxy)silane;
tetrakis (2-methoxyethoxy)silane;
tetramethoxysilane;
tetrapropoxysilane;
trichlorosilane;
triethylchlorosilane;
triethylsilane;
trimethoxysilylpropyldiethylenetri amine;
n-trimethoxysilylpropyl-n,n,n-trimethyl ammonium chloride;

trimethylbromosilane;
trimethylchlorosilane;
trimethylsilylacetamide;
trimethylsilyliodide;
trimethylsilylnitrile;
trimethylsilyl trifluoromethanesulfonate;
vinyldimethylchlorosilane;
vinylmethyldichlorosilane;
vinylmethyldiethoxysilane;
vinyltrichlorosilane;
vinyltriethoxysilane;
vinyltriethoxysilane;
vinyltris(2-methoxyethoxy)silane;

The amount of silane employed is not critical, but rather depend on a number of factors including the degree of substitution of reactive functional groups on the polymer and the desired characteristics of the final coating. As little as about 0.25% by weight based on the total weight of the solids content of the coating composition can be used to provide a coating. However, if a coating that can withstand 200 MEK rubs is desired silane amounts of from about 0.25% to about 10.0% by weight can be used.

In order to form a cured coating, one or more of the polymers as described above are crosslinked utilizing a one-package system or a two-package system. In a one-package system the polymer is combined with the silane to form a stable paint system at storage temperatures. In a two-package system, the polymer and the silane are kept separate until just prior to or upon application of the composition. Advantageously, no external catalyst (such as an inorganic acid) is needed in curing preferred compositions in accordance with this disclosure.

The coating compositions of the present invention may be basecoat and clearcoat compositions. The composition may be in the form of substantially solid powder, a dispersion, or in a substantially liquid state. Liquid coatings may be solvent borne or waterborne. The coatings may also include solvents, pigments, catalysts, hindered amine light stabilizers, ultraviolet light absorbers, rheology control additives, photoinitiators and other additives known to one skilled in the art.

Coating compositions can be coated on the article by any of a number of techniques well-known in the art. These include, for example, spray coating, dip coating, flow coating, roll coating, curtain coating, vacuum coating, and the like.

After an article is coated with the above-described layers, the composition is subjected to conditions so as to cure the coating layers. Curing is achieved by removing water. Although air curing may advantageously be used with the coating compositions described herein, heat-curing is preferred. Generally, heat curing is effected by exposing the coated article to elevated temperatures. Curing temperatures will vary depending on the particular compounds employed on the composition, however they generally range between about 20° C. and about 180° C., and are preferably between about 50° C. and about 120° C. The curing time will vary depending on the particular components used, and physical parameters such as the thickness of the coating layers applied, however, typical curing times range from about 0.5 to about 30 minutes.

The present invention is illustrated by the following non-limiting example.

EXAMPLE 1

A coating formulation having the composition shown in Table 1 is prepared by adding the latex emulsion to a stainless steel container. The adipic acid dihydrazide is sifted into the container with continued stirring for one hour to produce "Part A". To a mixture of a wetting agent and a stabilizer (diamino silane) is added water, defoamer and thickener. Then a portion (approximately 20%) of Part A is added under agitation. Next, $TiO_2$ and Kaolin are added. After stirring for about 30 minutes, the remainder of Part A is slowly added with continued stirring for 15 minutes. Then, a mixture of the epoxy silane and water is slowly added, followed by the surfactant solution. The viscosity is adjusted by adding additional thickener, if needed, and tint is added.

The resulting composition contains no isocyanate or formaldehyde and is useful as an exterior primer.

TABLE I

| Ingredient | Amount (pounds) |
| --- | --- |
| Part A | |
| XU41188.51* | 354.53 |
| (40–55% emulsion of a carboxylated styrene/acrylate polymer in water) | |
| adipic acid dihydrazide | 4.87 |
| Part B | |
| wetting agent | 8.68 |
| Hydrosil 2776 (diamino silane)** | 2.26 |
| Water | 117.55 |
| Defoamer | 1.85 |
| 2% Bentone LT solution (thickener) | 83.11 |
| Rutile $TiO_2$ | 44.35 |
| Kaolin | 442.77 |
| DYNASYLAN ® GLYMO (epoxy silane)** | 8.73 |
| Water | 22.99 |
| Water | 8.15 |
| surfactant solution*** | 24.97 |
| 2% Bentone LT solution (thickener) | 24.93 |
| Black Tint | 5.39 |
| Yellow Tint | 7.92 |

* Available from the Dow Chemical Company, Midland, Michigan
** Available from Hüls America, Inc., Somerset, N.J.
*** SURFYNOL 104 PA (8.51 lb) plus 16.46 lb. deionized water.

Comparative Example A

A coating composition was prepared having the formulation shown in Table I except that no adipic acid dihydrazide, diamino silane or epoxy silane was included.

Comparative Example B

A coating composition was prepared having the formulation shown in Table I except that 1% of a conventional crosslinker (isopropanolamine) was substituted for the adipic acid dihydrazide, diarnino silane and epoxy silane.

EXAMPLE 2

The physical properties of the coating composition of Example 1 were tested as follows:

Samples are prepared for testing by applying the coating to fiber cement panels. 2.07 grams of the coating composition are applied to a conventional 15.2 cm×15.2 cm fiber cement panel to provide a coating having a thickness of approximately 1 mil (0.0254 mm).

Solvent resistance of the coating is evaluated by exposing the coating to methyethylketone ("MEK"). Specifically, a cottonball soaked in MEK is rubbed lightly back and forth over the coating immediately following drying and cool down. For reproducibility and consistency the test is performed on glass. When a break in the coating is noted, the number of double MEK rubs is recorded. If a coating has not failed by 200 MEK rubs, the test is terminated and the results are reported as 200+rubs. One double MEK rub is one pass over and back with the MEK soaked cottonball.

The water resistance of the coating is tested using a "Cobb Test" as described in ASTM #D5795-95, Volume 6.01. A lower value indicates a greater water resistance. The Cobb Test is performed only after the samples have been allowed to reach equilibrium, in this case about five days.

The block resistance is tested as follows:

Following the cool down process of the finishing system, three fiber cement panels are arranged so that there is face to face contact and face to back contact. The panels are placed in a hydraulic press that has been preheated to a preselected temperature in the range of 140° F.–180 F. depending on the severity of the finishing system test requirements. The pressure is raised to 125 psi and held for 15 minutes. The panels are then checked for any sticking or blocking. The percent failure is recorded.

The abrasion resistance of the coating is tested by placing two fiber cement panels on a gardner scrub tester face to back. The top panel is attached to a pulley on the gardner scrub tester and weighted with a 2 kg weight. The scrub tester is turned on and the uncoated surface of the top panel slides back and forth, abrading the painted surface of the bottom panel. Each pass, over and back, is considered one cycle. When a paint breakthrough occurs, the number of cycles is recorded.

For comparison purposes, the coatings of Comparative Examples A and B are also tested. The results are given in Table II.

TABLE II

| Example | Double MEK Rubs | Water Resistance (Cobb Values) | Block Resistance (82° C., 125 psi) | Abrasion Resistance |
|---------|-----------------|-------------------------------|------------------------------------|---------------------|
| 2 | 200 | 127.63 | 0% | >100 |
| A | 23 | 237.79 | 15% | >100 |
| B | 146 | 152.31 | (not tested) | (not tested) |

As the foregoing data demonstrates, the coating in accordance with the present disclosure exhibited better solvent resistance, water resistance, block resistance and abrasion resistance compared to the Comparative Examples.

While the above description contains many specific details of compositions and methods, these specific details should not be construed as limitations on the scope of any inventions described, but merely as exemplifications of preferred embodiments thereof. Those skilled in the art will envision many other possible variations that are within the scope and spirit of the inventions as defined by the claims appended hereto.

What is claimed is:

1. A coating composition comprising:
   a polymer having at least one reactive group and at least one hydrazide group thereon, the hydrazide group having the formula:

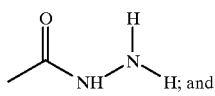

H; and a silane.

2. A coating composition as in claim 1, wherein the polymer is selected from the group consisting of acrylic polymers, modified acrylic polymers, polyepoxides, polyesters, polyurethanes, polyamides, polyimides, polysiloxanes, polycarbonates and mixtures thereof.

3. A coating composition as in claim 1, wherein the at least one reactive group is selected from the group consisting of carboxyl, hydroxyl, epoxy, keto, amino, and amido groups.

4. A coating composition as in claim 1, wherein the silane is a compound of the formula:

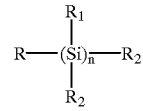

wherein n=1 to 1000; R is a hydrocarbon group containing from 1 to 20 carbon atoms, optionally R is a substituted hydrocarbon group containing from 1 to 20 carbon atoms; $R_1$ is the same or different at each occurrence and is a moiety selected from the group consisting of halogen, hydrogen, alkoxy, hydroxy, amino and epoxy groups; and $R_2$ can be the same or different at each occurrence and is selected from the group consisting of R and $R_1$ as defined above.

5. A coating composition as in claim 4, wherein the $R_1$ in the formula of the silane is selected from the group consisting of amino and epoxy groups.

6. A coating composition as in claim 1, further comprising a solvent.

7. A coating composition as in claim 6, wherein the solvent is water.

8. A coating composition comprising:
   a polymer having at least one reactive group and at least one hydrazide group thereon; and
   a silane, the coating composition containing substantially no isocyanate or formaldehyde.

9. A coating composition as in claim 8, wherein the polymer is selected from the group consisting of acrylic polymers, modified acrylic polymers, polyepoxides, polyesters, polyurethanes, polyamides, polyimides, polysiloxanes, polycarbonates and mixtures thereof.

10. A coating composition as in claim 8, wherein the at least one reactive group is selected from the group consisting of carboxyl, hydroxyl, epoxy, keto, amino, and amido groups.

11. A coating composition as in claim 8, wherein the silane is a compound of the formula:

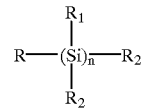

wherein n=1 to 1000; R is a hydrocarbon group containing from 1 to 20 carbon atoms, optionally R is a substituted hydrocarbon group containing from 1 to 20 carbon atoms; $R_1$ is the same or different at each occurrence and is a moiety selected from the group consisting of halogen, hydrogen, alkoxy, hydroxy, amino and epoxy groups; and $R_2$ can be the same or different at each occurrence and is selected from the group consisting of R and $R_1$ as defined above.

12. A coating composition as in claim 11, wherein the $R_1$ in the formula of the silane is selected from the group consisting of amino and epoxy groups.

13. A coating composition as in claim 8, further comprising a solvent.

14. A coating composition as in claim 13, wherein the solvent is water.

15. A method of coating comprising:
providing a composition containing a polymer and a silane, the polymer having at least one reactive group and at least one hydrazide group thereon, the hydrazide group having the formula:

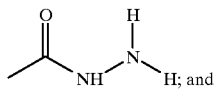

applying the composition to a substrate.

16. A method as in claim 15, wherein the polymer is selected from the group consisting of acrylic polymers, modified acrylic polymers, polyepoxides, polyesters, polyurethanes, polyamides, polyimides, polysiloxanes, polycarbonates and mixtures thereof.

17. A method as in claim 15, wherein the at least one reactive group is selected from the group consisting of carboxyl, hydroxyl, epoxy, keto, amino, and amido groups.

18. A method as in claim 15, wherein the silane is a compound of the formula:

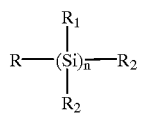

wherein n=1 to 1000; R is a hydrocarbon group containing from 1 to 20 carbon atoms, optionally R is a substituted hydrocarbon group containing from 1 to 20 carbon atoms; $R_1$ is the same or different at each occurrence and is a moiety selected from the group consisting of halogen, hydrogen, alkoxy, hydroxy, amino and epoxy groups; and $R_2$ can be the same or different at each occurrence and is selected from the group consisting of R and $R_1$ as defined above.

19. A method as in claim 18, wherein the $R_1$ in the formula of the silane is selected from the group consisting of amino and epoxy groups.

20. A method as in claim 15, wherein the composition contains a solvent and the method further comprises the step of removing the solvent from the composition after application to the substrate.

21. A method as in claim 20, wherein the solvent is water.

22. A method of coating comprising:
providing a composition containing a polymer and a silane, the polymer having at least one reactive group and at least one hydrazide group thereon; and
applying the composition to a substrate, the composition containing substantially no isocyanate or formaldehyde.

23. The method of claim 22, wherein the polymer is selected from the group consisting of acrylic polymers, modified acrylic polymers, polyepoxides, polyesters, polyurethanes, polyamides, polyimides, polysiloxanes, polycarbonates and mixtures thereof.

24. The method of claim 22, wherein the at least one reactive group is selected from the group consisting of carboxyl, hydroxyl, epoxy, keto, amino, and amido groups.

25. The method of claim 22, wherein the silane is a compound of the formula:

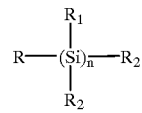

wherein n=1 to 1000; R is a hydrocarbon group containing from 1 to 20 carbon atoms, optionally R is a substituted hydrocarbon group containing from 1 to 20 carbon atoms; $R_1$ is the same or different at each occurrence and is a moiety selected from the group consisting of halogen, hydrogen, alkoxy, hydroxy, amino and epoxy groups; and $R_2$ can be the same or different at each occurrence and is selected from the group consisting of R and $R_1$ as defined above.

26. The method of claim 25, wherein the $R_1$ in the formula of the silane is selected from the group consisting of amino and epoxy groups.

27. The method of claim 22, further comprising a solvent.

28. The method of claim 27, wherein the solvent is water.

29. A method of preparing a coating composition comprising:
(a) reacting a polymer having at least one reactive group with a compound having a hydrazide group, the hydrazide group having the formula:

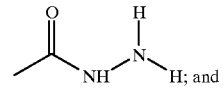

(b) combining the product of step (a) with a silane.

30. A method as in claim 29, wherein the polymer is selected from the group consisting of acrylic polymers, modified acrylic polymers, polyepoxides, polyesters, polyurethanes, polyamides, polyimides, polysiloxanes, polycarbonates and mixtures thereof.

31. A method as in claim 29, wherein the at least one reactive group is selected from the group consisting of carboxyl, hydroxyl, epoxy, keto, amino, and amido groups.

32. A method as in claim 29, wherein the silane is a compound of the formula:

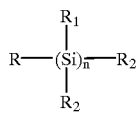

wherein n=1 to 1000; R is a hydrocarbon group containing from 1 to 20 carbon atoms, optionally R is a substituted hydrocarbon group containing from 1 to 20 carbon atoms; $R_1$ is the same or different at each occurrence and is a moiety selected from the group consisting of halogen, hydrogen, alkoxy, hydroxy, amino and epoxy groups; and $R_2$ can be the same or different at each occurrence and is selected from the group consisting of R and $R_1$ as defined above.

33. A method as in claim 32, wherein the $R_1$ in the formula of the silane is selected from the group consisting of amino and epoxy groups.

34. A method as in claim 29, wherein step (a) is conducted in the presence of a solvent.

35. A method as in claim 34, wherein the solvent is water.

36. A coating comprising a polymer crosslinked by a silane, the polymer having at least one reactive group and at least one hydrazide group thereon, the hydrazide group having the formula:

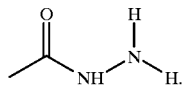

37. A coating as in claim 36, wherein the polymer is selected from the group consisting of acrylic polymers, modified acrylic polymers, polyepoxides, polyesters, polyurethanes, polyamides, polyimides, polysiloxanes, polycarbonates and mixtures thereof.

38. A coating as in claim 36, wherein the at least one reactive group is selected from the group consisting of carboxyl, hydroxyl, epoxy, keto, amino, and amido groups.

39. A coating as in claim 36, wherein the silane is a compound of the formula:

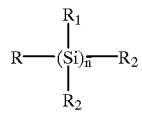

wherein n=1 to 1000; R is a hydrocarbon group containing from 1 to 20 carbon atoms, optionally R is a substituted hydrocarbon group containing from 1 to 20 carbon atoms; $R_1$ is the same or different at each occurrence and is a moiety selected from the group consisting of halogen, hydrogen, alkoxy, hydroxy, amino and epoxy groups; and $R_2$ can be the same or different at each occurrence and is selected from the group consisting of R and $R_1$ as defined above.

40. A coating as in claim 39 wherein the $R_1$ in the formula of the silane is selected from the group consisting of amino and epoxy groups.

41. A method of preparing a coating composition comprising:

(a) reacting a polymer having at least one reactive group with a compound having a hydrazide group; and (b) combining the product of step (a) with a silane for preparing a coating composition containing substantially no isocyanate or formaldehyde.

42. A method as in claim 41, wherein the compound having a hydrazide group is selected from the group consisting of polyhydrazide compounds.

43. A method as in claim 41, wherein the compound having a hydrazide group is adipic acid dihydrazide.

44. A method as in claim 41, wherein the polymer is selected from the group consisting of acrylic polymers, modified acrylic polymers, polyepoxides, polyesters, polyurethanes, polyamides, polyimides, polysiloxanes, polycarbonates and mixtures thereof.

45. A method as in claim 41, wherein the at least one reactive group is selected from the group consisting of carboxyl, hydroxyl, epoxy, keto, amino, and amido groups.

46. A method as in claim 41, wherein the silane is a compound of the formula:

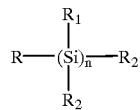

wherein n=1 to 1000; R is a hydrocarbon group containing from 1 to 20 carbon atoms, optionally R is a substituted hydrocarbon group containing from 1 to 20 carbon atoms; $R_1$ is the same or different at each occurrence and is a moiety selected from the group consisting of halogen, hydrogen, alkoxy, hydroxy, amino and epoxy groups; and $R_2$ can be the same or different at each occurrence and is selected from the group consisting of R and $R_1$ as defined above.

47. A method as in claim 46, wherein the $R_1$ in the formula of the silane is selected from the group consisting of amino and epoxy groups.

48. A method as in claim 41, wherein step (a) is conducted in the presence of a solvent.

49. A method as in claim 48, wherein the solvent is water.

50. A coating comprising a polymer crosslinked by a silane, the polymer having at least one reactive group and at least one hydrazide group thereon, the coating containing substantially no isocyanate or formaldehyde.

51. A coating as in claim 50, wherein the polymer is selected from the group consisting of acrylic polymers, modified acrylic polymers, polyepoxides, polyesters, polyurethanes, polyamides, polyimides, polysiloxanes, polycarbonates and mixtures thereof.

52. A coating as in claim 50, wherein the at least one reactive group is selected from the group consisting of carboxyl, hydroxyl, epoxy, keto, amino, and amido groups.

53. A coating as in claim 50, wherein the silane is a compound of the formula:

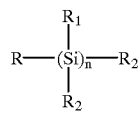

wherein n=1 to 1000; R is a hydrocarbon group containing from 1 to 20 carbon atoms, optionally R is a substituted hydrocarbon group containing from 1 to 20 carbon atoms; $R_1$ is the same or different at each occurrence and is a moiety selected from the group consisting of halogen, hydrogen, alkoxy, hydroxy, amino and epoxy groups; and $R_2$ can be the same or different at each occurrence and is selected from the group consisting of R and $R_1$ as defined above.

54. A coating as in claim 53, wherein the $R_1$ in the formula of the silane is selected from the group consisting of amino and epoxy groups.

* * * * *